United States Patent [19]

Lee et al.

[11] Patent Number: 5,007,748
[45] Date of Patent: Apr. 16, 1991

[54] PRINTER FOR BAR CODE USING THIN AND THICK BAR CODE FONTS

[75] Inventors: Ho C. Lee; John R. O'Toole, both of Endicott; Alex T. Shalkey; Jack L. Zable, both of Vestal, all of N.Y.

[73] Assignee: International Business Machines Corp., Armonk, N.Y.

[21] Appl. No.: 352,806

[22] Filed: May 16, 1989

[51] Int. Cl.$^5$ ............................................. B41J 5/00
[52] U.S. Cl. ................................. 400/103; 101/93.13; 400/145.1; 400/304
[58] Field of Search ................... 400/145.1; 101/103, 101/106–107, 304, 93.01, 93.22, 93.21, 93.13

[56] References Cited

U.S. PATENT DOCUMENTS

| | | | |
|---|---|---|---|
| 3,702,585 | 11/1972 | Landis et al. | 400/103 |
| 3,820,456 | 6/1974 | Wolfheimer | 400/103 |
| 3,869,980 | 3/1975 | Schroeder, Jr. | 101/93.21 |
| 3,977,509 | 8/1976 | Leersnijder | 400/103 |
| 3,983,805 | 10/1976 | Perkett et al. | 101/93.22 |
| 4,027,586 | 6/1977 | Hubbard | 101/43.01 |
| 4,278,018 | 7/1981 | Johannesson | 400/103 |
| 4,306,817 | 12/1981 | Alas | 400/103 |
| 4,396,303 | 8/1983 | Uddgren | 400/103 |
| 4,661,001 | 4/1987 | Takai et al. | 400/103 |
| 4,762,063 | 8/1988 | Yeagle | 101/93.01 |
| 4,810,867 | 3/1989 | Speicher | 400/103 |
| 4,824,266 | 4/1989 | Fujii et al. | 400/103 |
| 4,917,011 | 4/1990 | Mernauer | 400/103 |

FOREIGN PATENT DOCUMENTS

| | | | |
|---|---|---|---|
| 2456527 | 8/1976 | Fed. Rep. of Germany | 400/103 |
| 2466344 | 4/1981 | France | 400/103 |
| 0212176 | 9/1987 | Japan | 400/103 |
| 0238749 | 10/1987 | Japan | 400/103 |
| 0249753 | 10/1987 | Japan | 400/103 |
| 2072098 | 9/1981 | United Kingdom | 400/103 |

OTHER PUBLICATIONS

"Print Hammer Arrangement", IBM Tech. Discl. Bull., vol. 9, No. 8, 1/67, pp. 1013-1014.
"Multi-Tierless Condensed Bar Code", IBM Tech. Discl. Bull., vol. 26, No. 2, 7/83, pp. 766-767.

Primary Examiner—Eugene H. Eickholt
Attorney, Agent, or Firm—John S. Gasper

[57] ABSTRACT

An impact printing device for printing bar code patterns on an information carrier, the patterns including a combination of parallel thin and wide bars separated by spaces wherein the wide bars can have an imprint width which is a multiple of the thin bars, comprising a movable type carrier, a plurality of bar code type elements on said type carrier, the bar code type elements including first type elements having a pair of imprint forming parallel thin bars and second type elements having a single imprint forming thick bar, and a plurality of print hammers each defining a print position of a print line and each operable selectively to successively impact combinations of the first and second type elements at the same print position to form completed bar code imprints at the print position having a wide bar imprint with a width greater than the single thick bars of the second type elements.

11 Claims, 10 Drawing Sheets

RIGHT 0

RIGHT 1

RIGHT 2

RIGHT 3

RIGHT 4

RIGHT 5

PRINTER FOR BAR CODE USING THIN AND THICK BAR CODE FONTS

FIELD OF THE INVENTION

This invention relates to a printer apparatus for printing bar code and particularly to a high speed impact line printer for printing bar code patterns made up of parallel bars and spaces of different widths.

BACKGROUND OF THE INVENTION

Impact line printers comprise a continuously revolving type carrier having engraved type elements such as alphanumeric characters moving past a row of individually operable print hammers. A control system, which might include a print line buffer for storing a line of data to be printed, a band image buffer which stores an image of the arrangement of the characters on the type carrier along with timing and hammer firing circuitry, selectively operates the hammers in synchronism with the motion of the characters. Imprints of the type elements are produced on a print medium by causing the print medium and the type elements to be impacted against each other as a result of the selective operation of the print hammers while the type carrier is in motion. The print medium is incremented one or more line spaces at the completion of a print line and the process repeated for successive lines of print.

Bar code patterns can be of two types, the picket fence made up of a pattern of vertical bars and spaces, and the ladder code made up of a pattern of horizontal bars and spaces. In either case, the bar code patterns can include bars and spaces of different widths. The type carrier then includes vertical or horizontal type bars. A problem arises when such bar code is printed on a high speed impact line printer. The problem is especially difficult when the wide bar is three or four times the width of the single width bar. If the hammer energy level is high enough to form good density imprints of the wide bars, then paper cutting or embossing can occur when printing thin bars which affects the machine readability of the imprints. Alternatively if the energy level is reduced to avoid cutting or embossing the paper, then the imprint of the wide bars results in faint imprints which again affect machine readability. One solution, of course, might be to selectively alter the energy of the hammers dependent on the width of the type bars. Such an approach would be conveniently done in serial type impact printers which operate at relatively slow speeds. However, for high speed impact printers, altering hammer impact energy levels for individual hammers dependent on the width of the bar would slow the printing process and introduces considerable complexity into the controls and complicates the flight timing of the hammers which varies dependent on the hammer energy level.

Examples of multiple width printer devices are shown in U.S. Pat. Nos. 3,834,506; and 3,820,643. These patents show multiple width bar code printing using two print bars operated simultaneously to print bars side by side to form bars of widths greater than either bar. In order for the hammers to be individually operable, some spacing must exist between them which tends to cause the combined bar width to have some gap potential. U.S. Pat. No. 4,396,303 shows printing multiple width bar imprints by combining single width bars printed from single width print bars closely adjacent each other. This printer requires moving of the paper to get the close spacing of the bar imprints. Other examples of impact printing devices for printing bar code patterns with bar imprints of different widths are shown in U.S. Pat. Nos. 4,027,586 and 4,762,063 and the article of R. L. Gilbert in the IBM Technical Disclosure Bulletin of October 1974, Vol. 17, No. 5 pp. 1321-1322. These show type carriers with type bars of different widths which are impacted by print hammers. None of these items deal with the problem of printing multiple width bar patterns with single energy hammers.

SUMMARY OF THE INVENTION

Basically the invention overcomes the above mentioned problem in a high speed on-the-fly impact printer by printing a succession of partial bar code imprints using combinations of different bar code type elements with the same hammer where a succeeding imprint partially overlays the preceding bar code imprints. Another feature of the invention comprises using type bar elements which are combinations of two single width bars and one multiple width bar whereby the type bar elements have equal type surface area. In this way the hammer energy level can be uniform regardless of the bar symbols being printed and ink ribbon wear will not be accelerated.

The foregoing and other objects, features and advantages of the invention will be apparent from the following more particular description of (a) preferred embodiment(s) of the invention, as illustrated in the accompanying drawing(s).

DETAILED DESCRIPTION OF THE INVENTION

Figure 4:
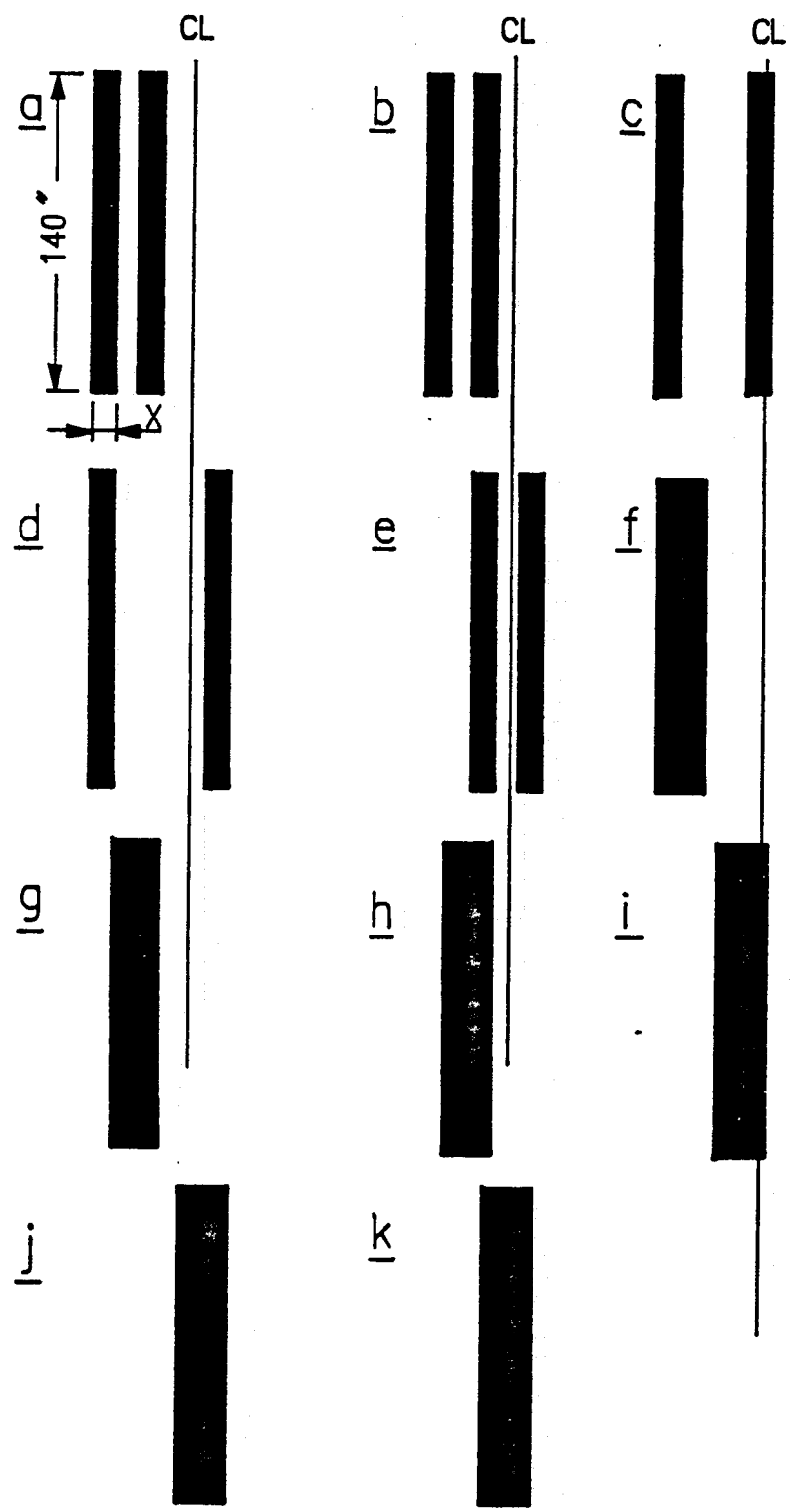
FIG. 4 is a chart showing the positioning of the vertical type bar elements on the type band 10 for printing some of the symbols of FIG. 3.
Figure 5:
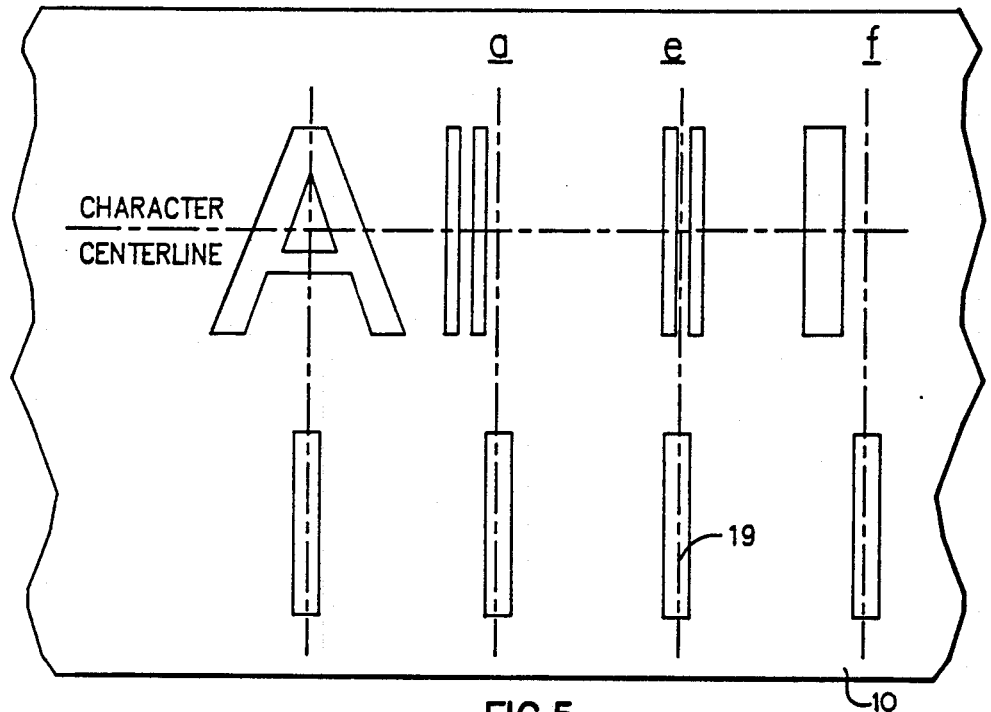
FIG. 5 is a plan view of a fragment of type band showing an arrangement of some of the vertical type bars shown in FIG. 4 for use in printing multiple width vertical bar code in accordance with this invention.

The printer mechanism, as shown in the figures, comprises a continuous type band 10, platen 11, ink ribbon 12, paper web 13 and electromagnetically operated print hammers 14 mounted on frame element (not shown) and arranged in a row parallel with the straight portion of type band 10. Type band 10 is supported by a pair of drive pulleys 16 and 17. A drive motor (not shown) which may be connected to either drive pulley operates to move the type band 10 at constant speed during the printing operation. Type band 10, in one form in which the invention may be practiced, has engraved alphanumeric type elements 18, and, as seen more clearly in FIGS. 4 and 5, either vertical or horizontal type bar elements arranged in a single row around the outer surface of type band 10. Type band 10 also has timing marks 19 which are sensed by transducer 20 which, with timing circuit 21, generates print scan pulses to hammer control 22 and printer control 23 which selectively operate print hammers 14 in timed relation with the motion of type elements 18 on band 10. Timing marks 19 are customarily uniformly spaced except that there may be a missing timing mark or other band identification marks included on the band. Alphanumeric characters 18 are typically aligned with the timing marks 19. Vertical bar code type elements 24 are aligned with or offset relative to timing marks 19 either to the right or left of the timing marks 19 as seen in FIGS. 4 and 5. This enables the vertical bar type elements to be aligned for impact at different positions within the impact areas of the print hammers 14. Horizontal bar code type elements 25 are essentially centrally aligned with the individual timing bars 19.

Print hammers 14 are arranged facing type element type band 10 with paper web 13, ink ribbon 12 and interposer 30 therebetween. Web 13 may comprise a substrate on which merchandise labels (not shown) are removably attached for the purpose of printing either alphanumeric or bar code imprints or both. Web 13 is fed in line increments by tractors 26 of well known type (see FIG. 2) driven by motor 27 in response to motor drive signals supplied by print control 23. Ink ribbon 12 extends between spools 28 and 29 connected to drive means (not shown) for advancing ribbon 12 in alternate directions. Interposer 30 is a plastic material and is preferably a polymer of the type described in co-pending application Ser. No. 07/328,426 filed 03/23/89.

Figure 1:
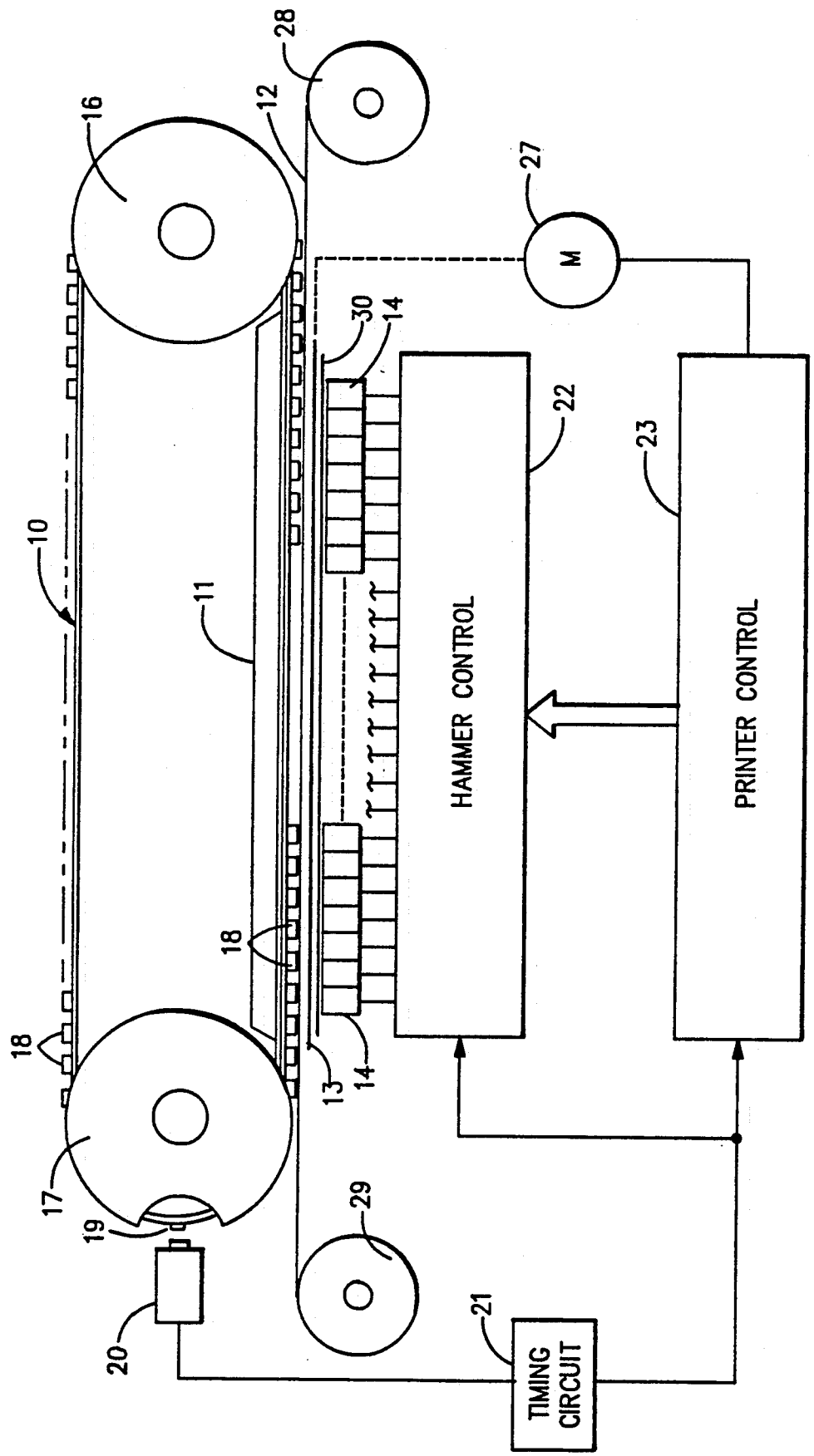
FIG. 1 is a schematic of a high speed printer apparatus showing a printer system for practicing the invention.
Figure 2:
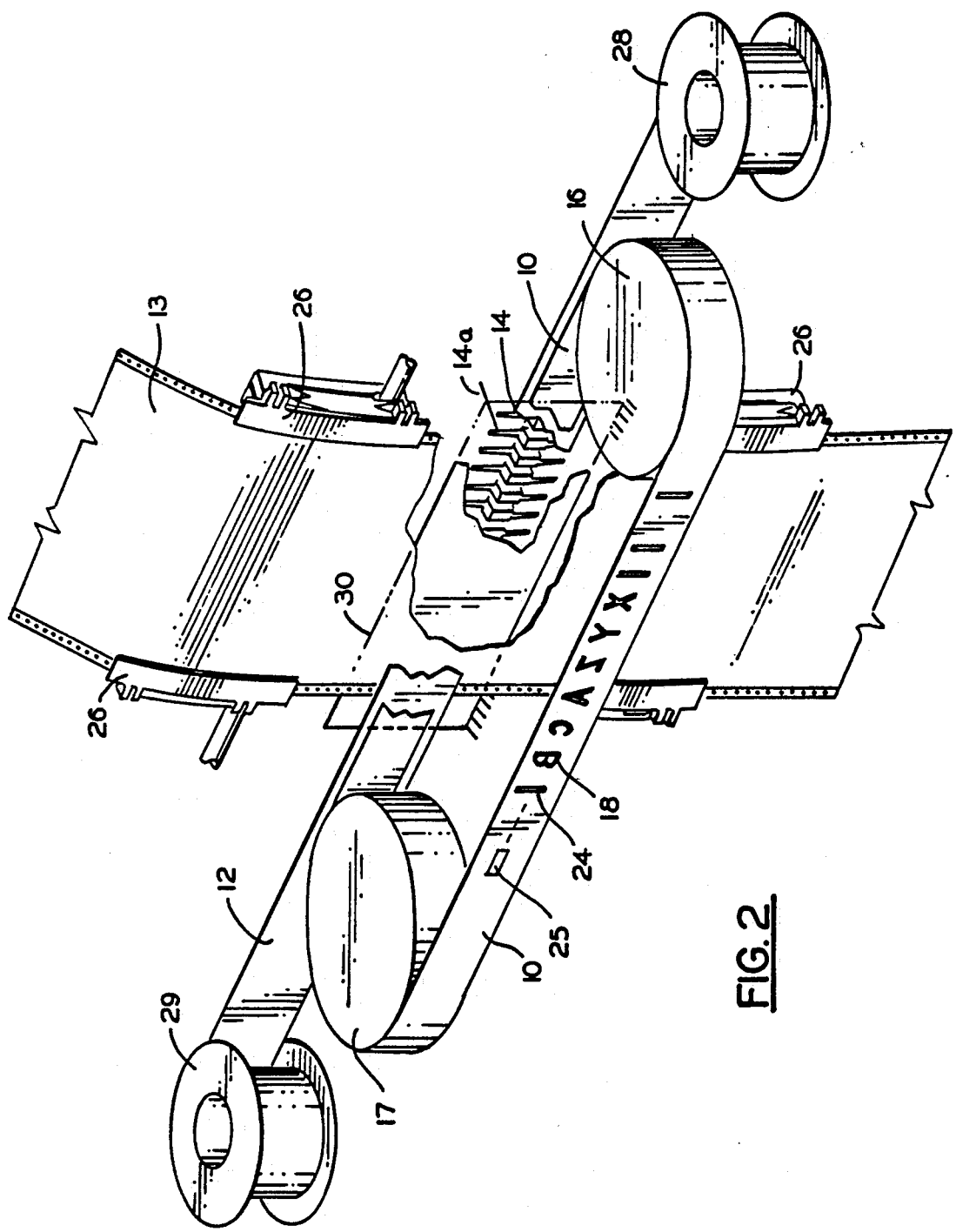
FIG. 2 is a three dimensional view of a portion of a printer mechanism usable in FIG. 1 in which the invention is used.

Print hammers 14 are uniformly spaced over the distance which represents the length of the print line of paper web 13. The number of print positions can vary and is typically 132 per print line. The number of hammers 14 can vary depending on the span of the individual hammers. For example, there is a single print hammer 14 as shown in FIG. 2 for each print position. Alternatively, the print hammers 14 can span more than one print position. In either case, the spacing of the print hammers 14 is typically different from the spacing of the type elements on band 10. Consequently during the revolution of type band 10 by pulleys 16 and 17, as is well known, subgroups of type elements align with subgroups of print hammers 14 across the print line in what are commonly called subscan sequences. Printer control 23 and hammer control 22 operate print hammers 14 in accordance with the subscan sequence alignments. Such controls are well known in the art and have been used in such printers as the IBM 1403, 4248 and 6262 Printers.

Printer control 23 would include print line and band image buffers (not shown) as well as other operating controls for selectively firing the hammers when characters to be printed are aligned with selected print hammers 14. Such controls are described in further detail in numerous patents including U.S. Pat. No. 4,376,411. In the practice of this invention, print hammers 14 are fired by printer control 23 more than once in printing a line of bar code. Operating a print hammer 14 more than once in a print cycle is practiced in high speed band printers by a method known as over-striking. This method is used for printing Hangul (Korean alphabet) and is well known. Essentially, print hammers 14 may be controlled by printer control 23 by forming a firing table for each line of print using the print line data stored in the print line buffer and the band image stored in the band image buffer. The process of building hammer firing tables is shown and described in U.S. Pat. No. 4,273,041.

Figure 3:
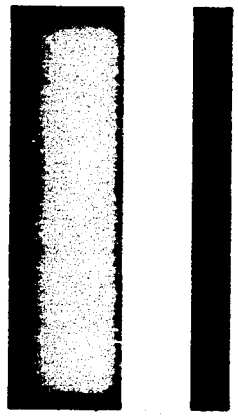
FIG. 3 is a table showing a portion of the symbols useable for printing a combination of single and multiple width UPC bar code patterns in the vertical or picket fence mode.
Figure 3:
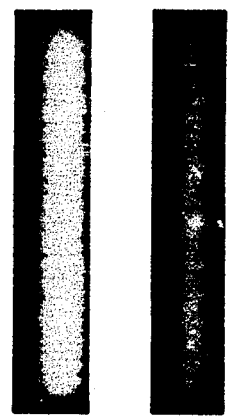
Figure 3:
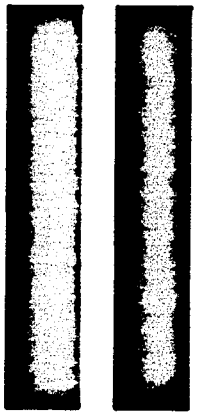
Figure 3:
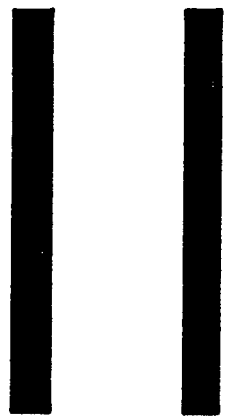
Figure 3:
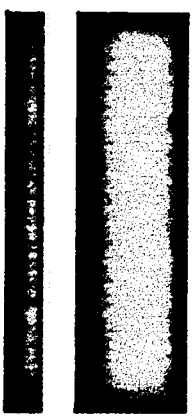
Figure 3:
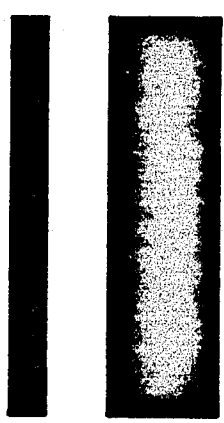

FIG. 3 shows 6 of the 20 or more imprints of characters, Right 0 through Right 5, for printing UPC bar code patterns in the picket fence mode. As shown, all except Right 3 are formed from a combination of single wide and multiple wide bars. Right 0, Right 4, and Right 5 comprise a three wide bar and a single wide bar. Right 1 and Right 2 comprise two double wide bars. Right 3 comprises two bars of single width. Each of the two bar imprints shown are formed within the width of a single hammer. Printing the combinations shown in a single impact would require too much hammer energy. Printing a single wide bar alone and with the same print energy can cause excessive paper embossing as well as severe ribbon wear.

FIG. 4 shows the type bar elements a through k used in combination to print the UPC bar code characters in FIG. 3. As shown, the type elements comprise two single wide (x) vertical bars a through e and single double wide (2x) vertical type bars bars f through k. It should be noted that each of the type bar elements a through k is located within the impact area of a given print hammer and is positioned on the type band 10 at some location relative to the center line CL which represents the center line of the print hammer impact area as well as the center line of the timing marks on band 10. This is also illustrated in FIG. 5 where bar code characters a, e, and f are illustrated in position relative to the timing marks 19. The remainder of the type bar elements in FIG. 4 as well as other sets (not shown) of the two kinds of type bars present a complete set for printing picket fence UPC. It should be noted, in accordance with this invention, that the type bars of FIGS. 4 and 5 present equal areas for impacting by the print hammers 14. In this manner, the energy level of the print hammers 14 can be uniform and is compatible with printing alphanumeric characters 18 in combination with bar code patterns.

Figure 6:
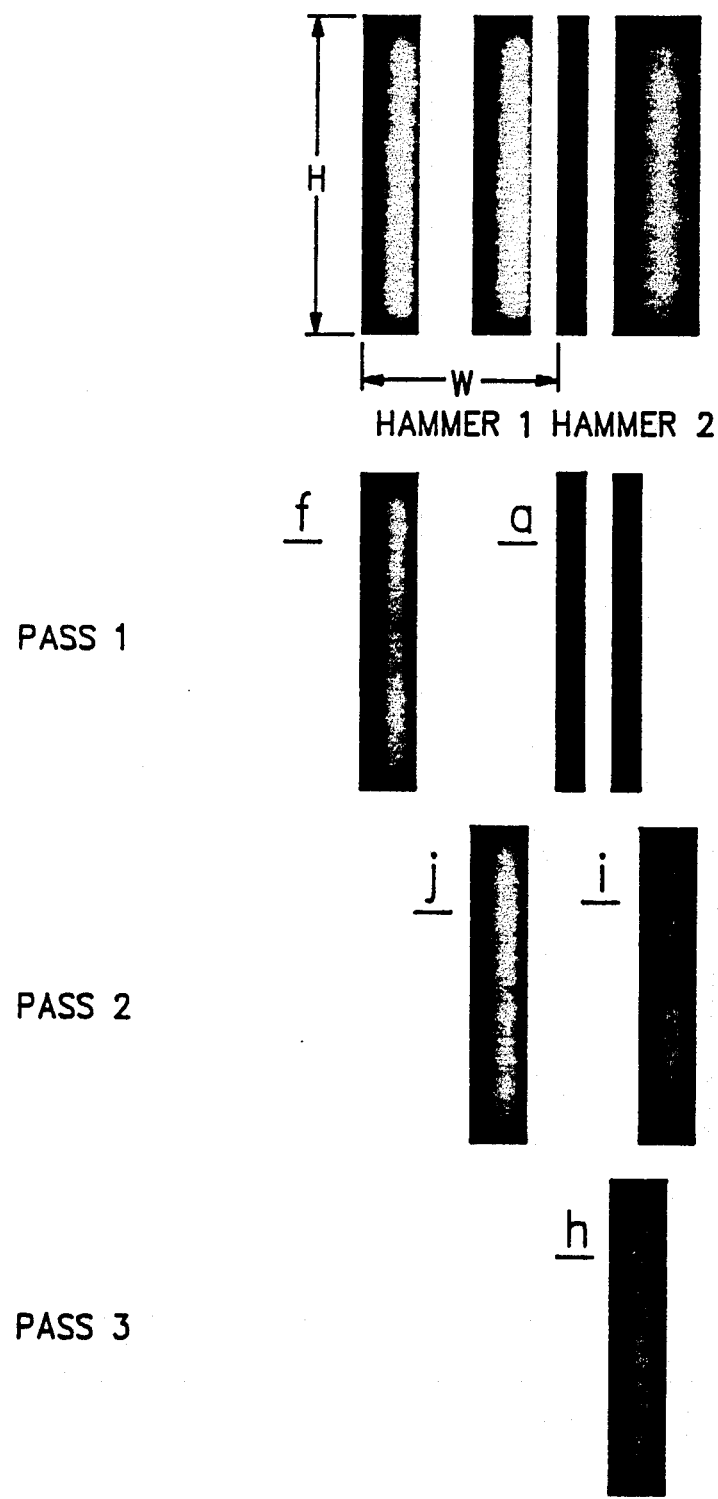
FIG. 6 is a chart illustrating the sequence of printing a combination of the symbols of FIG. 5 using the type elements in FIG. 4 for printing a partial UPC bar code pattern.

FIG. 6 shows the process of printing where Right 1 is printed by Hammer 1 and and Right 4 is printed by Hammer 2, Hammers 1 and 2 being any two adjacent print hammers 14. With the print medium 13 located at the line position selected by printer control 23, and with type band 10 rotating at constant speed causing the sets of type bar elements and character elements to move repeatedly past the print hammers 14, type bar element f of two wide dimension is impacted by Hammer 1 and type element a is impacted by hammer 2. Without incrementing print medium 13, type bar element j is impacted by Hammer 1 and type bar element i is impacted by Hammer 2. To assure that the three wide imprint of Right 4 has no gap between the single wide bar of type bar character a and type bar character i when printed, a third pass is used wherein type bar element h is impacted by print hammer 2 so as to overlap both i and the rightmost bar of a.

In cases where the bar width extends beyond the hammer width, the overlap in the interhammer gap is accomplished in the similar manner described above. For example, if a bar width spans across the gap between hammer 1 and hammer 2, hammer 1 may impact a type element the right edge of which extends slightly to the right of hammer 1, while hammer 2 impacts another type element the left edge of which extends slightly to the left of hammer 2. The characteristics of such overlap is well described in co-pending application Ser. No. 07/328,426 filed 03/23/89.

For all bar code symbologies in the picket fence orientation it is preferred that the x dimension be a submultiple of the hammer spacing. Additionally it is preferred that a bar code character length (intercharacter space included) be an integral multiple of the hammer spacing. Additionally the character height should be an integral multiple of the paper increment distance.

The fonts shown in FIG. 4 are optimized for UPC. For other bar code symbologies, it is probable that there would be a different array of type elements. However the principles for establishing the arrays would be the same. The type elements would be of equal area and contain overlapping elements. Additionally the number of type elements would be minimized.

Figure 7:
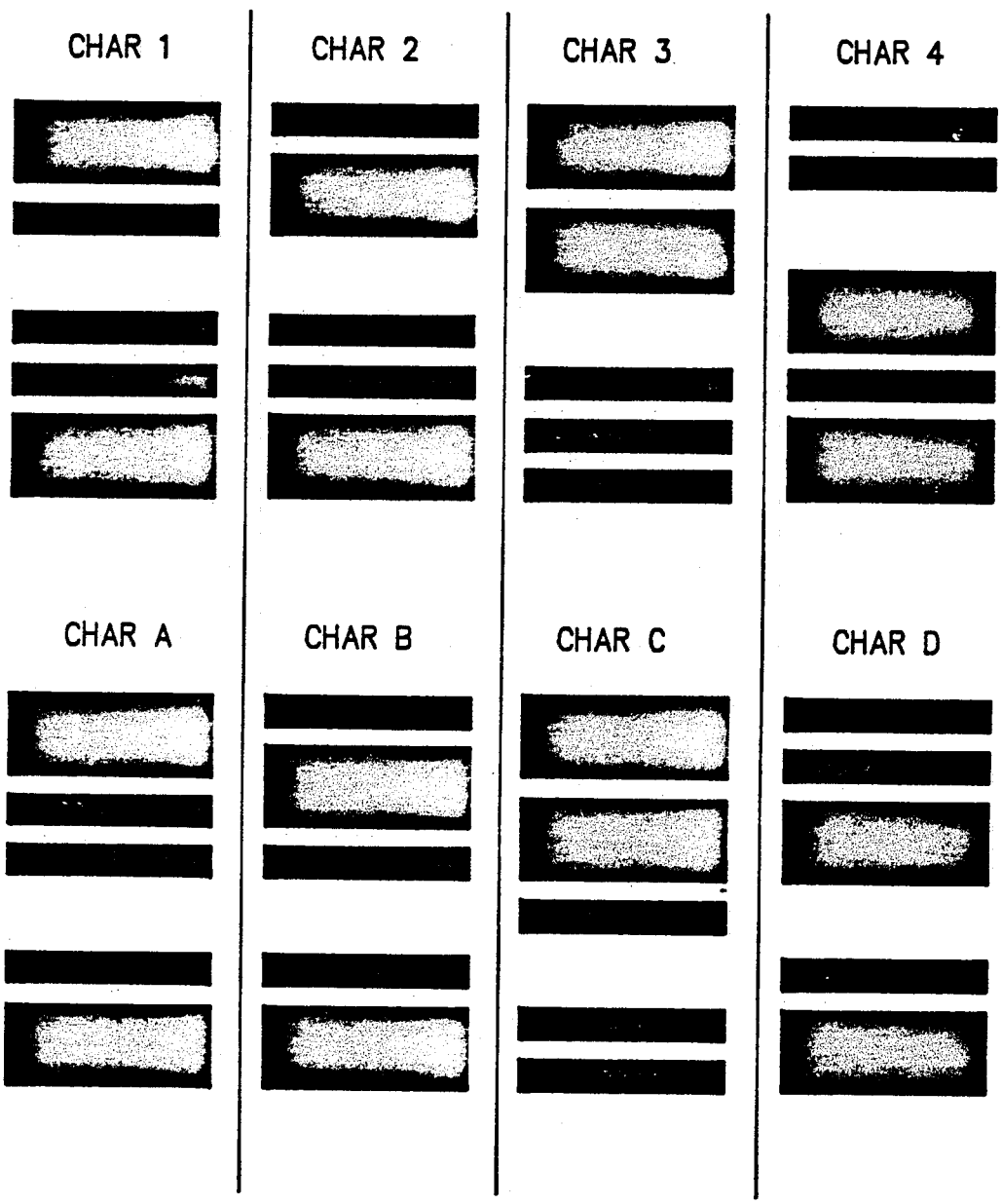
FIG. 7 is a table of a portion of the symbols useable for printing a 3 of 9 bar code pattern in the horizontal or ladder mode.

FIG. 7 shows eight different characters, Char 1 through 4 and A through D, for printing 3 of 9 ladder bar code, with a wide to narrow bar width ratio equal to three. A complete ladder bar code pattern would include a combination of several of those shown and other symbols not illustrated to simplify the discussion. It should be noted that Chars 1 through 4 and A through D are comprised of imprints of three wide bars and spaces and single wide bars and spaces.

Figure 8:
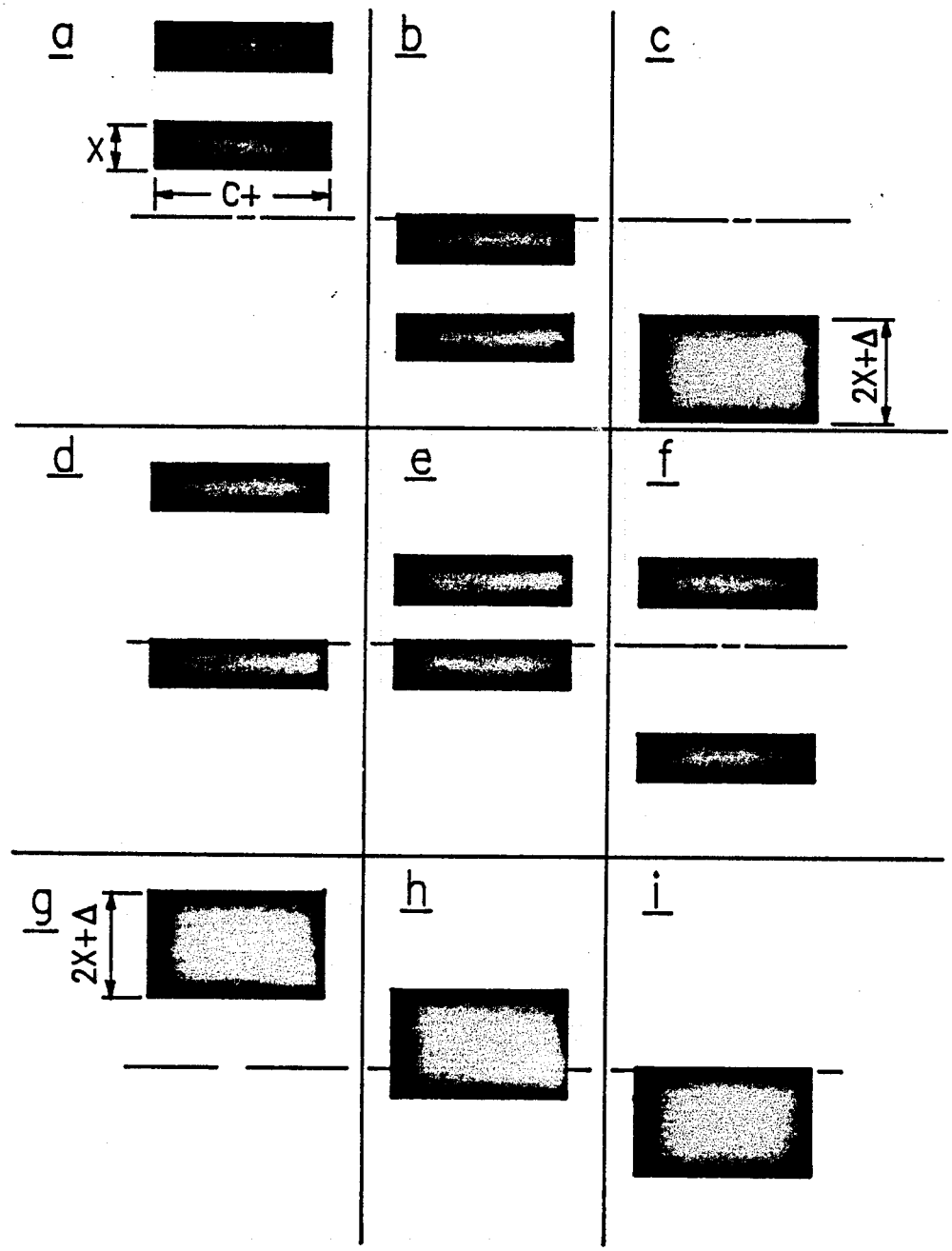
FIG. 8 is a chart showing the positioning of horizontal type bar elements on band 10 for printing some of the symbols of FIG. 7.

FIG. 8 shows the type elements a-i for printing Char 1-4 and A-D of FIG. 7. As shown, type bar elements a-i are positioned above or below the character center line CCL of type band 10 and comprise two single wide (x) bars or a single bar which is two wide plus delta. In this instance, the wide bars for characters c, g-i are only slightly larger than two wide (2x) so that there is no substantial difference in the amount of energy required from print hammers 14. By making the wide bars slightly larger than 2x, there can be overlap which assures that gaps do not appear in the imprints of three wide bars.

The width of the bars, c+, is slightly greater then the hammer spacing. This in concert with the use of interposer, 30, will allow for the horizontal overlap of adjacent horizontal printed bars.

Figure 9:
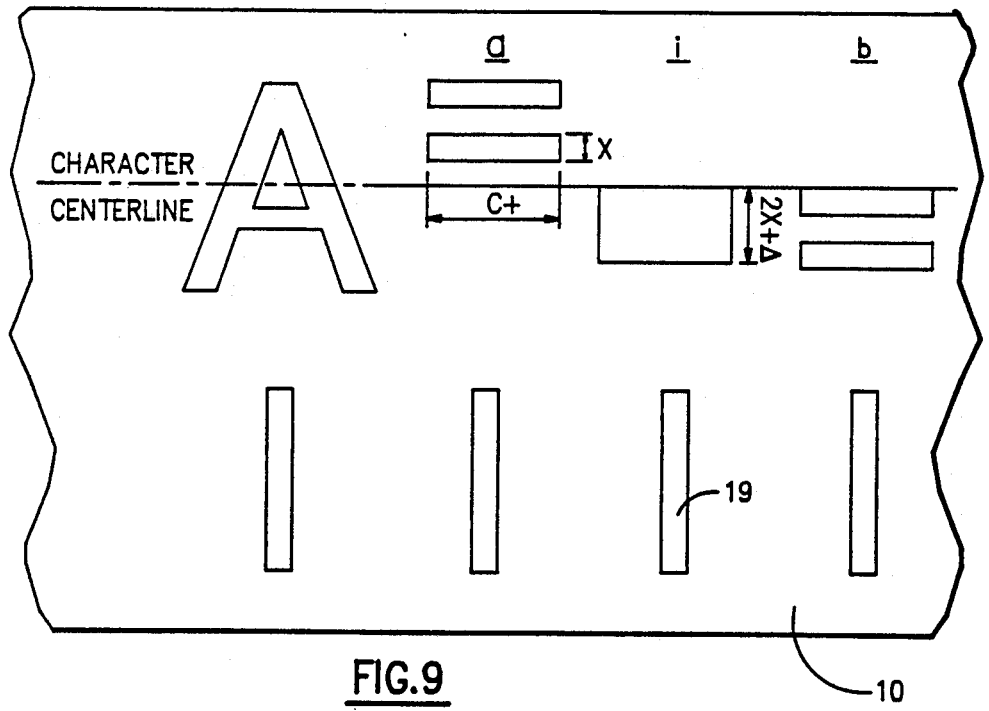
FIG. 9 is a plan view of a fragment of type band 10 showing an arrangement of horizontal type bars of FIG. 8 for use in printing multiple width horizontal bar code in accordance with this invention.

FIG. 9 shows the positioning of type bar elements a, i and b relative to the timing marks 19 and the character centerline CCL of band 10. The other type bar elements of FIG. 8 would also be similarly positioned to form a complete set of horizontal type bar elements for printing 3 of 9 bar code with a 3:1 wide to narrow bar width ratio. This is repeatedly presented in passes to print hammers 14.

Figure 10:
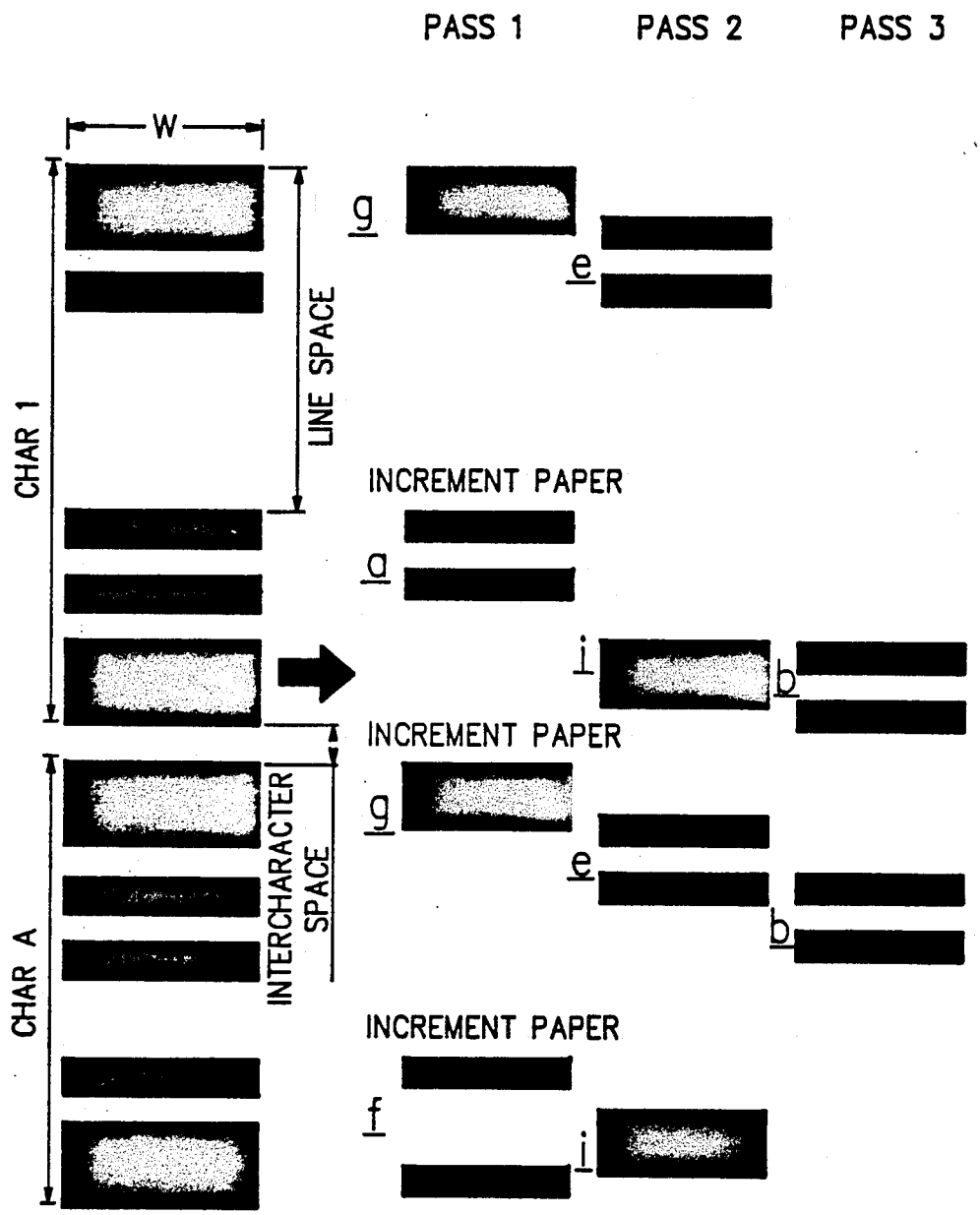
FIG. 10 is a chart illustrating the sequence of printing a combination of the symbols of FIG. 8.

FIG. 10 shows the process of printing Char 1 and Char A of a FIG. 7 using several of the type bar elements illustrated in FIGS. 8 and 9. As shown, the topmost three wide bar of Char 1 is printed in Pass 1 by hammer 1 impacting type bar g which is 2x plus delta wide. Without incrementing print medium 13, hammer 1 is again operated to print character e. In this case, the topmost bar of type bar e overlaps the delta portion of imprint made by type bar element g thereby producing the combination of the three wide and single wide imprint in two passes. This completes the top half of the character. Printer control 23 then increments the print medium 13 one line space. In the next print cycle, the lower portion of Char 1 is printed using type bar element a which is impacted by hammer 1 to form the two single wide (x) imprints. On pass 2, part of the lowermost three wide imprint is formed by hammer 1 impacting type bar element i which is 2x plus delta wide. On pass 3, the three wide imprint is completed by impacting type bar element b with hammer 1.

To print Char A directly below Char 1, as is usual in ladder printing, print medium 13 is incremented a line space, which includes the intercharacter space distance. As seen, the uppermost portion of Char A comprise a combination of a three wide imprint and two single wide imprints. In this instance, type bar elements g and e are printed in successive passes to form the three wide imprint and the first single wide bar as previously discussed in connection with printing Char 1. An added Pass 3 is employed to print the second single wide bar. In this instance, type bar element b is used. In this case, there is direct overlap of single wide imprints. While a single wide bar alone could be used to complete the topmost portion of Char A, this would not be in accordance with the desired equality of area and would result in possible embossing of the print medium and would cause non-uniform wearing of the ink ribbon 12 thus ultimately affecting imprint quality. Again after incrementation of print medium 13 by printer control 23, the bottommost portion of Char A, comprised of a single wide imprint above a three wide imprint, is printed using type bar element f in Pass 1 and type bar element i in Pass 2.

If the characters printed in the above example spanned multiple adjacent print positions, then each of the hammers associated with these print positions would follow the same hammer fire sequence described for hammer 1 in the example.

In the above example, the printing is confined within the line spacing. In the case where the bar width spans across the boundary of two print lines, the interline overlap is accomplished in the similiar manner described above. In the upper line, the lower most imprint may extend below the line width. Or, in the lower line, the uppermost imprint may extend above the line space. Alternately, the over-lap may be done by extending the imprints for both lines.

For other bar code symbologies with a ladder orientation, it is preferred that the x dimension be a submultiple of the line space distance. Furthermore it is preferred that the character length (including the intercharacter space) be a multiple of the paper increment distance. This allows for the least number of type elements.

Other fonts would probably be required for other bar code symbologies. The principles of equal type element area, appropriate overlapping, and minimum number of type elements should be followed.

For bar code symbologies (ladder or picket fence) with a relatively large x dimension (low density bar code), a font would consist of single bars having a dimension of x, and similar single bars having a dimension of $x+\Delta$.

Figure 11:
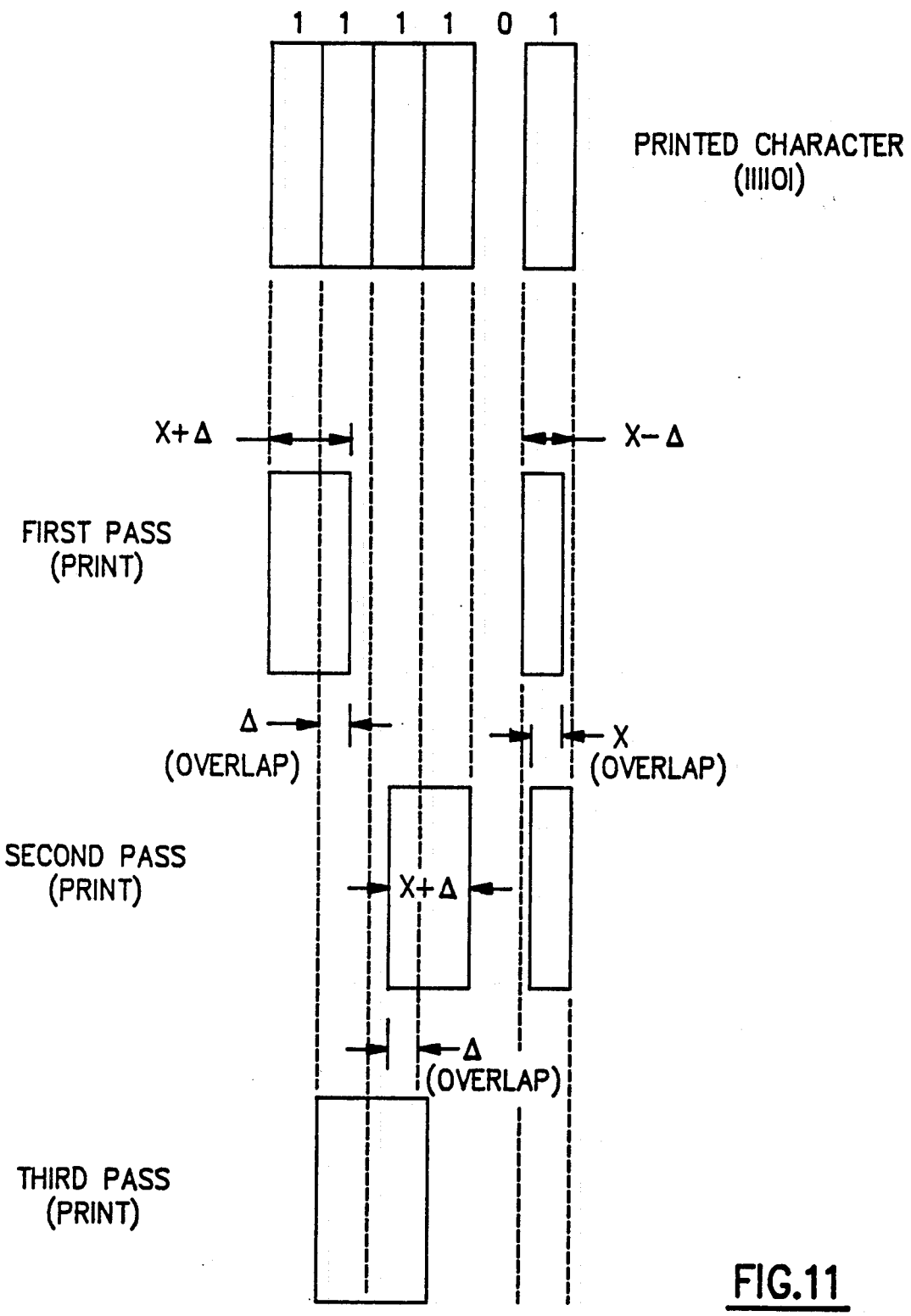
FIG. 11 is a chart illustrating another sequence of printing vertical bar code with additional types of vertical type bars.

FIG. 11 shows a sequence for printing four wide imprints in combination with a single wide imprint. For illustrative purposes, this is shown in the picket fence mode. In the process of FIG. 11, type bar element having x plus and x minus delta type bars are used. Thus in printing a four wide imprint representing 111101, an x plus delta and an x minus delta bar are printed by hammer 1 to form a first portion of the four wide bar and a portion of the single wide imprint. In the second pass, a second x plus delta and a second x minus delta bar are used in combination to be impacted by hammer 1 to form another portion of the four wide imprint and to complete the single wide imprint. Because there is a gap between the partial imprints of the four wide bar, a third pass is used to print with a two wide bar which forms an imprint overlapping both the first and second portions of the four wide bar. It is to be noted that in this form in which the invention is practiced, the type bar elements are formed of a combination of two type bars or a single type bar which have equal surface area. Again, uniform energy hammer levels can be maintained and ink ribbon wear is minimized. A further advantage of using dual bars and bars of equal surface area is that the number of type bar elements is greatly reduced thereby reducing the type set for printing any specific bar code using narrow and wide bars thereby enabling printing to take place at high throughput rates.

While the invention was in connection with UPC and 3 of 9 bar code printing patterns, it is to be understood that the principles of equal surface area type bar elements using single and multiple bars and overlapping some of the imprints to prevent gaps in the multiple or single width bars can be readily used with other bar code patterns involving a mixture of bars of various widths.

While the invention has been particularly shown and described with reference to preferred embodiments thereof, it will be understood by those skilled in the art that various changes in form and details may be made therein without departing from the spirit and scope of the invention.

We claim:

1. An impact printing device for printing bar code patterns on an information carrier, said patterns including a combination of parallel thin and wide bars separated by spaces wherein said wide bars can have an imprint width which is a multiple of said thin bars, comprising
    a movable type carrier,
    a plurality of bar code type elements on said type carrier,
    said bar code type elements including first type elements having a pair of imprint forming parallel thin bars and second type elements having a single imprint forming thick bar, and
    a plurality of print hammer means each defining a print position of a print line and each operable selectively to successively impact combinations of said first and second type elements at the same print position to form completed bar code imprints at said print position having a wide bar imprint with a width greater than said single thick bars of said second type elements.

2. An impact printing device as in clam 1 wherein said pairs of thin bars and said single thick bars of said type elements are vertical bars.

3. An impact printing device as in claim 1 wherein said pairs of thin bars and said single thick bars of said type elements are horizontal bars.

4. An impact printing device as in claim 1 wherein said bar code imprints having said greater width are formed by overlapping said thick and thin bars of said first and second type elements.

5. An impact printing device as in claim 1 wherein the combined impact surfaces of said pairs of thin bars of said first type elements and the impact surface of said single thick bar of said second type elements are substantially equal.

6. An impact printing device as in claim 4 wherein said single thick bar of said second type elements is a delta increment wider than the desired bar code imprint and
    said completed bar code imprints are multiple width imprints produced by overlapping combinations of said thick bars with each other or with one of said thin bars of said type elements to form multiple width bar code imprints.

7. A device as set forth in claim 2 wherein said hammer means comprises a plurality of print hammers, and a width of said thin bars (x) is a sub-multiple of a spacing between said print hammers, whereby the number of required type elements is minimized.

8. A device as set forth in claim 2 wherein the number of required type elements is minimized by selection of character heights that are multiples of a paper increment distance.

9. A device as set forth in claim 3 wherein the number of required elements is minimized by selection of thin bar widths (x) that are sub-multiples of a paper increment distance.

10. A device as set forth in claim 3 wherein said print hammer means comprises a plurality of hammers and the number of required elements is minimized by selection of bar code character widths (w) that are multiples of a spacing between said hammers.

11. An impact printing device for printing bar code patterns on an information carrier, said patterns including a plurality of parallel bars of different widths separated by spaces, comprising
    a movable type carrier,
    a plurality of type elements on said type carrier,
    said type elements including thin bars having widths equal to "x" and thicker bars having widths equal to "x+d" where "d" is substantially less than "x", to permit overlapping of said thicker bar and either another thicker bar or said thin bar, and
    print hammer means operable a succession of times for impacting different combinations of said thin and thicker bar type elements at approximately the same print position to form overlapped bar code imprints having a width greater than said thin or thicker bars.

* * * * *